April 14, 1964 D. J. BOES ET AL 3,129,186
DAMPING AND FLOTATION FLUID
Filed March 24, 1961
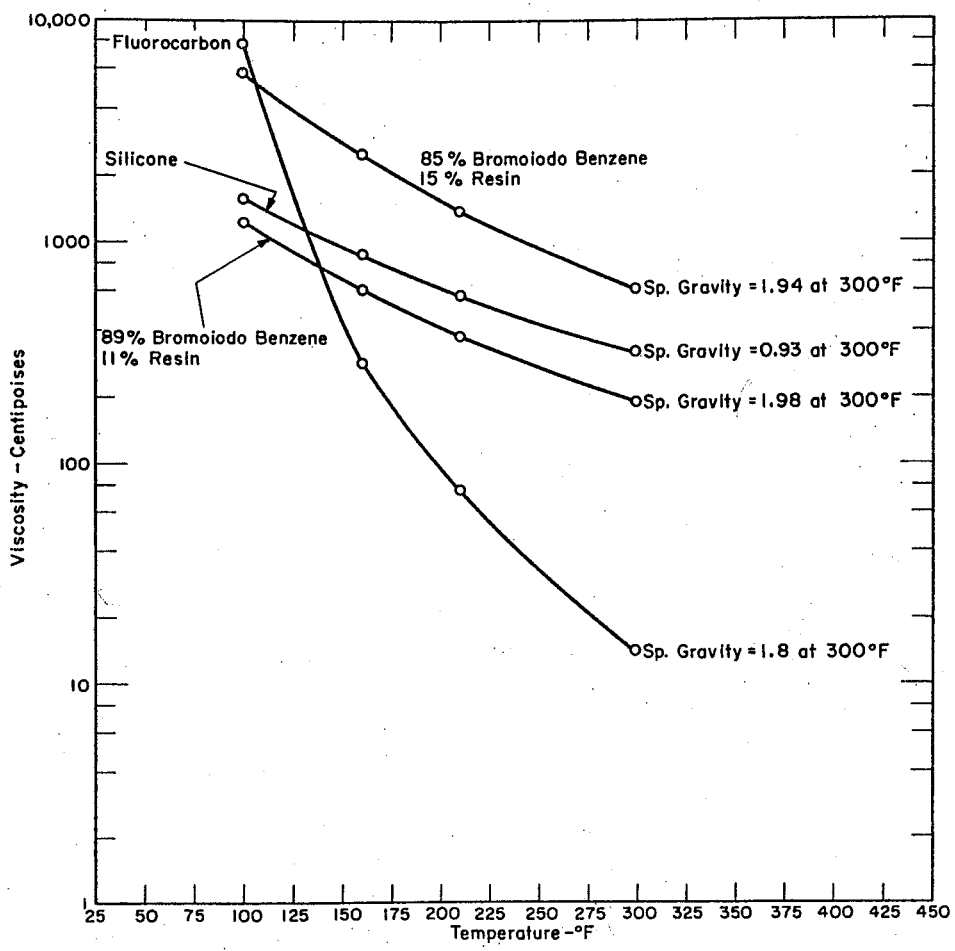
Viscosity-temperature characteristic comparisons of "Bromoiodo benzene/acrylic ester resin" blends with conventional damping – flotation fluids.
WITNESSES:
INVENTORS
David J. Boes and
James H. Freeman.
BY
ATTORNEY 3,129,186
DAMPING AND FLOTATION FLUID
David J. Boes, Monroeville, and James H. Freeman, Franklin Township, Westmoreland County, Pa., assignors to Westinghouse Electric Corporation, East Pittsburgh, Pa., a corporation of Pennsylvania
Filed Mar. 24, 1961, Ser. No. 98,021
7 Claims. (Cl. 252—78)

The present invention relates to a novel fluid composition characterized by high density and high viscosity over a wide temperature range. More particularly, the invention relates to a fluid mixture containing a halogenated aromatic compound and an acrylic ester thick-750° F. to about 1000° F., whereas, as little as 15 years ening agent. The novel compositions have particularly desirable damping and flotation properties, are non-corrosive in nature, and are chemically stable at elevated temperatures.

With the extremely rapid increase in the operational speeds and altitudes of aircraft and missiles in recent years, it has become necessary to operate various components associated therewith at ever increasing temperatures. Certain components, such as, for example, bearings and their lubricants are now required to operate at ago, the maximum temperature requirement was about 300° F. Although other vital systems in aircraft and missiles have not undergone as severe a rise in their required operating temperatures, the present control systems, including gyroscopes and accelerometers, are required to operate at approximately 300° F. The previous maximum temperature was about 160° F.

It has become increasingly difficult to obtain fluids which exhibit adequate viscosity (damping) and high density (flotation) in combination at the high operating temperatures encountered by the present day control systems. Most of the fluids which were operable at the lower ambient temperatures underwent such a severe decrease in viscosity as the temperatures rose to 300° F. that they were unsuitable for these applications. Those fluids which did retain high viscosity were either far too low in density (poor flotation ability), were hard waxes at tempeartures as high as 140° F., were chemically unstable at elevated temperatures, or were corrosive toward the metals employed in the systems. Inasmuch as the damping and flotation fluids represent one of the most important considerations in the design of gyroscopes and accelerometers, these deficiencies inherent in prior art fluids have posed serious problems to those engaged in the aircraft industry.

It is a primary object of this invention to provide a high density, high viscosity fluid composition which exhibits greatly improved flotation and damping properties over an extended temperature range.

A further object of the invention resides in the provision of a novel damping fluid composition characterized by chemical stability and non-corrosiveness at elevated temperatures.

Still another object resides in the provision of a novel damping fluid which is operable over a wide range of operating temperatures of present day aircraft and missile control systems.

Other objects will become apparent from the following detailed description of the invention. The description will be given with particular reference to the drawing in which the figure is a graphic presentation of the density and viscosity values of the novel damping fluid over a wide temperature range.

Broadly, the invention stems from the totally unexpected discovery that a mixture of a halogenated aromatic compound and an acrylic ester provides a damping fluid characterized by physical properties which are greatly improved over prior art damping fluids.

More specifically, the halogenated aromatic compound must be one which has a specific gravity appreciably in excess of 2.0 and is preferably a liquid at relatively low temperatures. In this respect, the fluid monobromo-monoiodobenzenes are well adapted for use in accordance with the invention. These compounds have specific gravities of the order of magnitude of about 2.25. To the contrary, such compounds as the dichlorobenzenes and dibromobenzenes have specific gravities lower than 2.0 and are therefore less suitable for use as high temperature damping fluids. Higher halogenated aromatic compounds are generally unsuitable since they are solids at or above room temperature. None of the polyhalogenated aliphatic compounds is desirable inasmuch as the class, as a whole, is chemically unstable at elevated temperatures. Under high heat these compounds emit halogen acids which are highly corrosive and toxic.

The aircraft and missile industry has established specifications for high temperature damping and flotation fluids which, as hereinbefore stated, require that the fluid has a specific gravity of about 2.0 or more at 300° F. Additionally, the fluid should have a minimum viscosity, at 300° F., of 250 centipoises and a pour point maximum of 65° F.

Accordingly, it has been found that the acrylic ester thickening agent, which may be blended with about 80–93% of the bromoiodobenzene, should be polymerized to such an extent that blending about 7% to about 20% thereof, by weight of the entire composition, will not exhibit a viscosity for the composition below about 180 centipoises at 300° F. Moreover, the composition, in the quantity ranges stated should maintain a density of about 2.0 or greater in the region of 300° F. Acrylic ester polymers which may be employed in the practice of this invention includes those represented by the materials marketed by the Du Pont Company under the name "Lucite," or by Rohm & Haas Company under the name "Plexiglas." Resins having satisfactory thickening action are those capable of giving a viscosity of about 40 to 70 sec. at 25° C. between concentrations of 15 and 45% in toluene solution (measured by No. 15 Parlin cup). Typical examples of such polymers are "Lucite" 41 (polymethylmethacrylate), "Lucite" 42 (polyethylmethacrylate) and "Lucite" 45 (polyisobutylmethacrylate).

In preparing the novel composition of the invention, the acrylic ester is physically blended into the bromoidobenzene. To assist in dissolving the resin, it is suitably first dissolved in a solvent such as methylene chloride, benzene, or the like and blended with the bromoiodobenzene and the entire mix is then heated to an elevated temperature to drive off the solvent. Heating to about 150° C. will usually suffice. After cooling, the bromoi-odobenzene-resin blend is again mixed until a homogeneous solution is obtained.

EXAMPLE I

*Fluid Employing 1-Bromo-2-Iodobenzene*

The calculated amount of methacrylate resin ("Lucite" 41) is dissolved in 10 to 20 times its weight of methylene chloride. To the resulting solution is added the calculated amount of 1-bromo-2-iodobenzene with vigorous stirring. The methylene chloride is removed by distillation at a pressure of approximately 15 mm. The resultant fluid is filtered through a Buchner funnel and allowed to remain under vacuum until deaeration is complete (bubbling ceases). A range of compositions has been prepared and properties determined as shown in Table I.

TABLE I

| | Silicone | Fluoro-carbon | 1-bromo-2-iodobenzene +acrylate resin | | | |
|---|---|---|---|---|---|---|
| | | | 91.5% 8.5% | 89% 11% | 87% 13% | 85% 15% |
| Viscosity, centistokes: | | | | | | |
| 100 degrees F | 783 | wax | 186 | 572 | 1,022 | 2,763 |
| 160 degrees F | | | 100 | 242 | 507 | 1,226 |
| 210 degrees F | 286 | 40 | 67 | 185 | 318 | 676 |
| 300 degrees F | 159 | 8 | 38 | 95 | 186 | 304 |
| Viscosity, centipoises: | | | | | | |
| 100 degrees F | 1,567 | wax | 404 | 1,224 | 2,127 | 5,810 |
| 160 degrees F | | | 211 | 603 | 1,045 | 2,501 |
| 210 degrees F | 572 | 75 | 139 | 377 | 643 | 1,360 |
| 300 degrees F | 318 | 14 | 76 | 188 | 365 | 599 |
| Pour Point, degrees F | −50 | +90 | +15 | +20 | +20 | +25 |
| Specific Gravity: | | | | | | |
| 100 degrees F | 0.99 | 1.97 | 2.17 | 2.12 | 2.11 | 2.10 |
| 160 degrees F | | | | 2.08 | 2.06 | 2.04 |
| 210 degrees F | 0.96 | 1.88 | 2.07 | 2.04 | 2.02 | 2.01 |
| 300 degrees F | 0.93 | 1.80 | 2.00 | 1.98 | 1.96 | 1.94 |

In addition to the above data, all of the novel damping fluids have flash points of about 380° F. and fire points in excess of 460° F.

EXAMPLE II

*Fluid Employing 1-Bromo-3-Iodobenzene*

Example I is repeated but the meta substituted halobenzene is used instead of the ortho isomer. The compound is equally compatible with the methacrylate resin. Properties of the blend are found in Table II. The sightly lower densities, together with a somewhat steeper viscosity-temperature relationship, found for this composition, indicate that although it is adapted for use according to the invention, the ortho isomer of Example I is preferred.

TABLE II.—11% POLYMETHYLMETHACRYLATE IN 1-BROMO-3-IODOBENZENE

| Temperature, ° F. | Viscosity | | Density, gm./cc. |
|---|---|---|---|
| | Centistokes | Centipoises | |
| 100 degrees | 664 | 1,388 | 2.09 |
| 210 degrees | 164 | 328 | 2.00 |
| 300 degrees | 77 | 148 | 1.92 |

Some of these data are also presented graphically in the accompanying drawing. It will be noted that the bromoiodobenzene-resin fluids present relatively flat curves lying completely within the design specifications of the industry. It has been further found that the novel damping fluids exhibit no corrosivity, after exposure for 3000 hours at 300° F., toward gold, silver, copper, brass, aluminum, alnico, beryllium copper, silicon bronze, 304 stainless steel, tungsten carbide, silver solder 50/50, soft solder, steel and silicone wire enamel.

It was also observed that the 3000 hour period of aging at 300° F. resulted in no significant change in viscosity-temperature characteristics of the fluid in the presence of fluorosilicones, fluorocarbons, and silicone rubbers. It will be apparent from the foregoing tables that the dense viscous liquid damping compositions of this invention are chracterized by specific gravities of about 1.94 to 2.05 and viscosities of about 75 to 600 centipoises at temperatures of about 300° F.

It will be appreciated, from the foregoing description, that the present invention provides to those skilled in the art a solution to a serious damping and flotation fluid problem. The novel fluids are chemically stable, heat stable, non-corrosive, and are obtainable in high viscosities and with densities in excess of 2 gms./cc. at 300° F. Furthermore, because of their relatively low pour points and desirable viscosity-temperature characteristics, handling problems are minimized and warm-up time in the field, before the unit becomes functional, is reduced. Another advantage to be derived from the invention is the design of new gyros and accelerometers which may be permitted due to the physical properties of the novel fluids. The invention thus represents a decided advance in the art.

It is to be understood, however, that the above description and drawing are illustrative alone of the invention, and the invention is to be limited only by the scope of the appended claims.

We claim as our invention:

1. A dense viscous liquid damping composition adapted for prolonged service at elevated temperatures consisting essentially of from about 80% to about 93%, by weight, of a fluid monobromomonoiodobenzene and from about 7% to about 20%, by weight, of a polymeric acrylic ester selected from the group consisting of polymethylmethacrylate, polyethylmethacrylate and polyisobutylmethacrylate, said composition being characterized by specific gravities of about 1.94 to 2.05 and viscosities of about 75 to 600 centipoises at temperatures of about 300° F.

2. The composition of claim 1 in which the polymeric acrylic ester is polymethylmethacrylate.

3. The composition of claim 1 in which the polymeric acrylic ester is polyethylmethacrylate.

4. The composition of claim 1 in which the polymeric acrylic ester is polyisobutylmethacrylate.

5. The composition of claim 1 in which said acrylic ester has a viscosity of about 40 to 70 seconds at 25° C. in a concentration of 15 to 45% in toluene solution when measured by a number 15 Parlin cup.

6. The composition of claim 1 in which the monobromomonoiodobenzene is 1-bromo-2-iodobenzene.

7. The composition of claim 1 in which the monobromomonoiodobenzene is 1-bromo-3-iodobenzene.

References Cited in the file of this patent

UNITED STATES PATENTS

| 2,354,171 | Morgan | July 18, 1944 |
| 2,438,446 | Leland | Mar. 23, 1948 |
| 2,509,620 | Watson et al. | May 30, 1950 |
| 2,905,642 | Miller et al. | Sept. 22, 1959 |